United States Patent
Zimowski

(10) Patent No.: US 6,832,222 B1
(45) Date of Patent: Dec. 14, 2004

(54) TECHNIQUE FOR ENSURING AUTHORIZED ACCESS TO THE CONTENT OF DYNAMIC WEB PAGES STORED IN A SYSTEM CACHE

(75) Inventor: Melvin Richard Zimowski, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 280 days.

(21) Appl. No.: 09/602,249

(22) Filed: Jun. 23, 2000

Related U.S. Application Data

(60) Provisional application No. 60/140,761, filed on Jun. 24, 1999.

(51) Int. Cl.[7] .............................................. G06F 17/30
(52) U.S. Cl. .................................. 707/9; 707/3; 707/10; 707/201; 707/202; 707/203; 709/218; 709/219; 709/223; 709/229
(58) Field of Search ............................ 707/1, 3, 9, 201, 707/200, 203, 202, 10; 709/203, 223, 229, 219, 218; 711/119, 137; 715/513

(56) References Cited

U.S. PATENT DOCUMENTS

| | | | |
|---|---|---|---|
| 5,740,430 A | | 4/1998 | Rosenberg et al. .......... 707/200 |
| 5,878,223 A | | 3/1999 | Becker et al. .............. 709/223 |
| 5,889,958 A | * | 3/1999 | Willens ....................... 709/229 |
| 5,894,554 A | | 4/1999 | Lowery et al. ............. 709/203 |
| 5,961,603 A | * | 10/1999 | Kunkel et al. ............... 709/229 |
| 5,991,810 A | * | 11/1999 | Shapiro et al. .............. 709/229 |
| 6,112,279 A | * | 8/2000 | Wang .......................... 711/119 |
| 6,157,930 A | * | 12/2000 | Ballard et al. ............... 707/203 |
| 6,298,356 B1 | * | 10/2001 | Jawahar et al. ............. 707/201 |
| 6,311,207 B1 | * | 10/2001 | Mighdoll et al. ........... 709/203 |
| 6,393,526 B1 | * | 5/2002 | Crow et al. ................. 711/137 |
| 2003/0217117 A1 | * | 11/2003 | Dan et al. .................... 709/218 |

OTHER PUBLICATIONS

Wessels et al., "ICP and the Squid web cache", IEEE, 1998, pp. 345–357.*
Dutta, "Internet object caching", IEEE, 1998, pp. 95–118.*
Iyengar, A., et al. "Improving web server performance by caching dynamic data, Proceedings of the USENIX Symposium on Internet Technologies and Systems", pp. 49–60, Published: Berkeley, CA, USA, 1997, 262 pp.

* cited by examiner

*Primary Examiner*—Thuy N. Pardo
(74) *Attorney, Agent, or Firm*—Sughrue Mion PLLC

(57) ABSTRACT

A method, apparatus, and article of manufacture for processing a request that requires the dynamic generation of a web page. In accordance with the present invention, a request to generate a dynamic web page is received. It is determined whether the request can be satisfied by using a cached web page and whether the userid associated with the request is authorized to access the cached web page. When it is determined that the request can be satisfied and that the userid has the proper authorization, the cached Web page is used to satisfy the request.

42 Claims, 2 Drawing Sheets

TECHNIQUE FOR ENSURING AUTHORIZED ACCESS TO THE CONTENT OF DYNAMIC WEB PAGES STORED IN A SYSTEM CACHE

PROVISIONAL APPLICATION

This application claims the benefit of U.S. Provisional Application No. 60/140,761 entitled "TECHNIQUE FOR ENSURING AUTHORIZED ACCESS TO THE CONTENT OF DYNAMIC WEB PAGES STORED IN A SYSTEM CACHE," filed on Jun. 24, 1999, by Mel Zimowski, which is incorporated by reference herein.

BACKGROUND OF THE INVENTION

1. Field of the Invention

This invention relates in general to computer-implemented systems, and, in particular, to ensuring authorized access to dynamic Web pages stored in a system cache.

2. Description of Related Art

The Internet computer network is a collection of computer networks that exchange 15 information via the Transmission Control Protocol/Internet Protocol ("TCP/IP") protocol suite. Currently, the use of the Internet computer network for commercial and non-commercial uses is exploding. Via its networks, the Internet computer network enables users in different locations to access information stored in data sources (e.g., databases) on servers distributed across these networks.

The World Wide Web (i.e., the "WWW" or the "Web") is a hypertext information and communication system used on the Internet computer network with data communications operating according to a client/server model. Typically, a user of a Web browser at a Web client computer will request data stored in data sources from a Web server computer, at which Web server software resides. The Web server software interacts with other computer programs that use interfaces to connect to these data sources, for example, a database managed by a Database Management System ("DBMS"), or uses the interfaces directly to access these data sources. These computer programs residing at the Web server computer transmit the requested data to the client computer in worldwide web documents referred to as web pages. The data can be of many different types of information, including database data, images, video clips, or audio tracks.

Web pages can be static web pages (i.e. web pages with fixed content that are pre-generated long before the Web client request is issued) or dynamic web pages (i.e., web pages whose content is dynamically generated at the time the web client request is processed).

Dynamic web pages are typically expensive to generate because they contain data that must be obtained dynamically at web servers from either local or remote data sources. For this reason, web server caches are frequently used to store dynamic Web pages that are requested by multiple users.

Dynamic web pages often contain data from secured data stores. When a dynamic web page is created, the user identifier (userid) associated with the process or thread creating the web page must have the authority to access the data from the secured data stores that is to be incorporated into the web page. Several products that generate dynamic web pages also permit the selective caching of these dynamic web pages so that an individual dynamic web page need not be recreated when a subsequent request for the same page is processed. These products do not perform any authorization checks to determine whether the userid associated with the subsequent request has the authority to execute the application that generated the cached web page or to access any secured data or objects that may be contained within or referenced by that web page. Such an approach can easily make sensitive data contained within cached web pages available to users that lack the authorization to access and view it within the secured data stores from which it was originally extracted.

Thus, there is a need in the art for ensuring authorized access to the content of dynamic web pages stored in a system cache.

SUMMARY OF THE INVENTION

To overcome the limitations in the prior art described above, and to overcome other limitations that will become apparent upon reading and understanding the present specification, the present invention discloses a method, apparatus, and article of manufacture for processing a request that requires the dynamic generation of a web page.

In accordance with the present invention, a request to generate a dynamic web page is received. It is determined whether the request can be satisfied by using a cached web page and whether the userid associated with the request is authorized to access the cached web page. When it is determined that the request can be satisfied and that the userid has the proper authorization, the cached web page is used to satisfy the request.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

A. Overview

One embodiment of the present invention provides an authorization system. The embodiment of the invention permits the association of a usage scope with a cached dynamic web page that constrains access to the content of the dynamic web page when stored in a system cache. A thread or process having a userid without the proper authority to generate the cached web page or to access any secured data contained within the cached web page is not permitted to return the cached web page to the user that initiated the request.

The embodiment of the present invention employs caching directives that allow a web site administrator to specify the dynamic web pages that are to be cached. Each directive permits the specification of a usage scope with a value of PUBLIC or PRIVATE. The syntax and semantics of the caching directives is described below. The userid associated with the thread or process that created the dynamic web page and the usage scope for the web page are associated with the cached web page.

Reuse of the cached web page is permitted or denied to a subsequent thread or process based on the privileges of the userid associated with the thread or process requesting the cached web page. For a usage scope of PUBLIC, a thread or process is granted access to a cached web page if the userid associated with the thread or process is authorized to execute the application program (referred to in the preferred embodiment as a macro) that generated the cached web page. For a usage scope of PRIVATE, a thread or process is granted access to a cached web page if the userid associated with the thread or process requesting the cached web page is the same as the userid that was associated with the web server thread or process that originally created and cached the web page.

B. Hardware Environment

Figure 1:
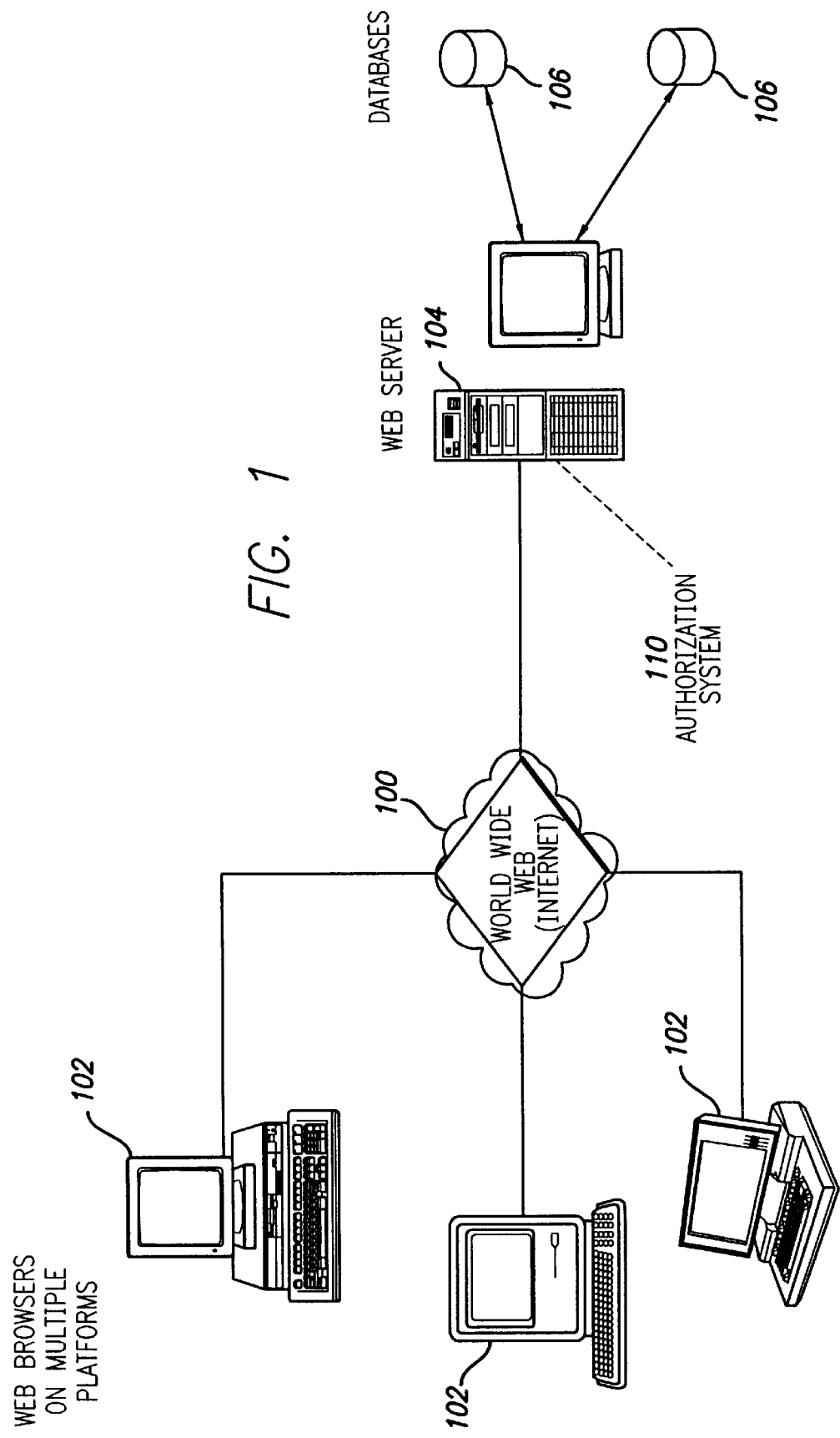
FIG. 1 schematically illustrates the hardware environment of a preferred embodiment of the present invention, and more particularly, illustrates a typical distributed computer system using the Internet.

FIG. 1 schematically illustrates the hardware environment of a preferred embodiment of the present invention, and more particularly, illustrates a typical distributed computer system using the Internet 100 to connect Web client computers 102 executing Web browsers to a Web server computer 104 executing Web server software and other computer programs that connect the server system 104 to data sources 106. A typical combination of resources may include client computers 102 that are personal computers or workstations, and a web server computer 104 that is a personal computer, workstation, minicomputer, or mainframe. These systems are coupled to one another by various networks, including LANs, WANs, SNA networks, and the Internet.

A Web client computer 102 typically executes a Web browser and is coupled to a Web server computer 104 executing Web server software. The Web browser is typically a program such as Microsoft's Internet Explorer or Netscape Navigator. The Web server software is typically a program such as IBM's HTTP Server or other WWW server software. The software executing on the Web server uses a data source interface and, possibly, other computer programs, for connecting to the data sources 106. The software executing on the Web server may also include an authorization system 110. The client computer 102 is bi-directionally coupled with the Web server computer 104 over a line or via a wireless system. In turn, the Web server computer 104 is bi-directionally coupled with data sources 106.

The data source interface permits the software executing on the Web Server to be connected to a Database Management System (DBMS), which supports access to a data source 106 by executing DBMS software. The DBMS may be located on the same server as the Web server computer 104 or may be located on a separate machine. The data sources 106 may be geographically distributed. The software executing on the Web server translates the request received from a Web browser into one or more statements (e.g., a macro file or a COBOL program) that can be processed to retrieve data from data sources 106.

Those skilled in the art will recognize many modifications may be made to this configuration without departing from the scope of the present invention.

C. Dynamic Web Page Caching Overview
1. Overview of Design

The caching of dynamic web pages enhances the Web server's ability to quickly serve web pages containing dynamic content. In the preferred embodiment, ASCII encoded web pages are cached in a database for reuse by the cache authorization system 110. This eliminates the costs associated with reconstructing a dynamic web page that is requested by multiple users. Web pages can be HTML web pages or XML documents.

A cached page is static, as the content of a cached page reflects the state of data stores and business logic at the time the web page was created. Subsequent changes to the data stores and business logic do not affect the content of the cached page.

Caching directives are used to specify, among other things, the web pages to be cached. A number of factors affect whether web pages should be cached. More specifically, a page should be cached when the page is repeatedly requested by users and when the content of the page changes infrequently. A page should not be cached when the processing associated with the generation of the web page makes changes to data sources. If a cached web page is used to respond to a user's request, the processing logic associated with the generation of the cached page is not executed and no changes are made to the data sources.

When the cache authorization system 110 (also referred to as the authorization system) is configured as a CGI application, the caching directives are processed for each cache authorization system user request. When the cache authorization system 110 is configured as a Web server plugin or as a servlet, the caching directives are processed once per web server address space at the time the first authorization system request is assigned to a worker thread associated with that address space. For additional information about worker threads, refer to U.S. patent application 09/104,879, filed on Jun. 25, 1998 by M. Zimowski, S. Greenspan, P. Livecchi, and J. Aman, entitled "METHOD AND SYSTEM FOR MANAGING CONNECTIONS TO A DATABASE MANAGEMENT SYSTEM".

Stored procedures are provided by the cache authorization system 110 for managing the contents of the cache.

2. Web Page Caching Directives

In the preferred embodiment, authorized Web server administrators configure the cache authorization system 110 to cache web pages by adding caching directives to the authorization system initialization file (db2www.ini).

In particular, the DTW_CACHE_PAGE directive is used to specify web pages that are to be cached by the cache authorization system 110. If the authorization system initialization file does not contain a DTW_CACHE_PAGE directive, then no web pages are cached.

The following is the syntax for the DTW_CACHE_PAGE directive:

DTW_CACHE_PAGE [=] file_name_spec|path_template_spec lifetime usage_scope

The term file_name_spec refers to the specification of one or all blocks within a macro file using the fully qualified name of the macro file. A macro file is an installation-provided application that the cache authorization system 110 executes to generate one or more web pages. A block is a subsection of a macro that is capable of generating a specific web page. For example, DTW_CACHE_PAGE=/u/USRND01/macros/custqord.d2w/Output specifies the caching of the web page created by the execution of the block Output in macro custqord.d2w in the directory /u/USRND01/macros. In the following additional example, DTW_CACHE_PAGE=/u/USRND01/macros/custqord.d2w/* specifies the caching of all web pages created by the execution of any block in macro custqord.d2w in the directory /u/USRND01/macros.

The term_path template_spec refers to the specification of blocks within macro files using a path template for one or more directories containing macro files. A path template contains the suffix/*. The authorization system caches all web pages created by the execution of blocks in macro files contained within the directory or directories that match the path template. For example, DTW_CACHE_PAGE=/u/USRND01/macros/* specifies the caching of web pages created by the execution of blocks in all macros contained within the directory /u/USRND01/macros and any subdirectory of /u/USRND01/macros. In the following additional example, DTW_CACHE_PAGE=/* specifies the caching of all web pages created by all authorization system macros.

The term lifetime refers to the minimum number of seconds that a cached web page is valid.

The term usage_scope specifies the degree to which the reuse of the web page is restricted. Reuse is granted or denied based on the authority of the userid associated with the request. Usage_scope can have a value of PUBLIC or PRIVATE. PUBLIC means that the cached web page should be served (i.e., returned to a user) when the user request matches the cache key (discussed in further detail below), the cached page is valid, and the userid associated with the web server thread or process processing the request is authorized to execute the macro that generated the page. PRIVATE means that the cached web page should be served when the user request matches the cache key (discussed in further detail below), the cached page is valid, and the userid associated with the web server thread or process processing the request is the same as the userid that was associated with the web server thread or process that originally created and cached the web page.

The caching directive can be specified multiple times. Namely, a different caching directive (i.e., DTW_CACHE_PAGE directive) can be specified for each file_name_spec or path_template_spec value. When the caching directives conflict with each other, the first directive specified takes precedence.

A cached page is reused for a request when the URL, the form data, and the query string of the request match the URL, form data, and query string of the request that caused the web page to be cached. Examples of caching directives are shown below:

EXAMPLE 1

Specifies the Caching Of Any Web Pages Generated When the Cache Authorization System Executes a Particular HTML Block In the Specified Macro DTW_CACHE_PAGE /u/USER1/macros/main.d2w/output 3600 PUBLIC In this example, the cache authorization system caches the Web pages generated when it executes the output block in the macro main.d2w, located in the /u/USER1/macros directory. The Web pages have PUBLIC scope, and remain valid for at least 1 hour.

EXAMPLE 2

Specifies the Caching Of Any Web Pages Generated When the Cache Authorization System Executes Any Block In the Specified Macro DTW_CACHE_PAGE/u/USER1/macros/main.d2w/* 1800PUBLIC In this example, the cache authorization system caches any Web pages the cache authorization system generates when it executes any block in the macro main.d2w, located in the /u/USER1/macros directory. The Web pages have PUBLIC scope, and remain valid for at least 30 minutes.

EXAMPLE 3

Specifies the Caching Of Any Web Pages Generated When the Cache Authorization System Executes Blocks In Macros Located In One Or More Directories DTW_CACHE_PAGE /u/USER1/macros/* 3600 PRIVATE In this example, the cache authorization system caches any Web pages the cache authorization system generates when it executes any block in any macro located in the /u/USER1/macros directory or any of its subdirectories. The Web pages have PRIVATE scope, and remain valid for at least 1 hour.

EXAMPLE 4

Specifies the Caching Of Any Web Page Generated By All Macros

DTW_CACHE_PAGE/* 3600 PUBLIC

In this example, the cache authorization system caches all Web pages that the cache authorization system generates. The Web pages have PUBLIC scope, and remain valid for at least 1 hour.

EXAMPLE 5

Specifies Multiple Web Pages Caching Directives

DTW_CACHE_PAGE /u/USER1/macros/main/* 1800 PUBLIC

DTW_CACHE_PAGE /u/USER1/macros/special/daily_news.d2w/* 43200 PUBLIC

DTW_CACHE_PAGE /u/USER1/macros/special/employee-stats.d2w/* 3600 PRIVATE

In this example, the cache authorization system caches the following: (1) All Web pages generated from any block in any macro located in the /u/USER1/macros/main/ directory. The Web pages have PUBLIC scope and remain valid for at least 30 minutes. (2) All Web pages generated by the daily_news.d2w macro in the directory /u/USER1/macros/special/. These Web pages have PUBLIC scope and remain valid for at least 12 hours. (3) All Web pages generated by the employee_stats.d2w macro in the directory /u/USER1/macros/special/. These Web pages have PRIVATE scope and remain valid for at least 1 hour.

After the web pages to be cached have been specified, the table used to cached the web pages must be set up. The following steps are necessary to set up the table used to cache the web pages:

a. Create the Web page cache table, SYSIBM.DTWCACHEPAGES.

b. Define the stored procedure used to insert the cached pages into SYSIBM.DTWCACHEDPAGES to the DBMS.

c. Prepare the stored procedure for execution using a userid with INSERT, SELECT, and DELETE privileges on SYSIBM.DTWCACHEDPAGES. The user IDs associated with the requests that cache pages must have the EXECUTE privilege for the stored procedure.

After the above three steps are completed, web pages can be cached.

3. Web Page Cache Key

The actual cache key for the cached dynamic web page consists of path information, macro name, HTML or XML block name, plus the query string plus the form data (if present) that caused the dynamic web page to be generated.

D. The Authorization system Dynamic Web Page Cache

1. The Authorization system Objectives

A web page may be defined as a set of HTML tags or a XML (Extensible Mark-up Language) document and the objects (e.g., DB2 large objects or LOBs) referenced by the web page using hypertext links.

The contents of a cached web page reflect the state of data stores and business logic at the time the cached web page was created. Thus, a cached web page is static. A cached web page is automatically deleted upon expiration of its lifetime (i.e., lifetime value plus creation time), when automatic management is enabled, or until deleted by an authorized web server administrator.

The following are elements that the authorization system is designed to achieve regarding authorized access to the dynamic web page cache and referenced objects. When serving a cached web page, the authorization system ensures that the user associated with the thread or process requesting the cached page has the proper authority to access the cached page. The determination of proper authority is based on reuse criteria in effect at the time the authorization system cached the web page. The authorization system enforces the reuse criteria during validation of all subsequent attempts to access the cached page. A cached Web page is not returned to a user unless the user's request satisfies the reuse criteria.

2. The Authorization System Dynamic Web Page Cache Table

ASCII encoded web pages are cached in a data store for reuse by the authorization system. In the preferred embodiment, referenced objects are large objects (LOBs). Caching directives specify the web pages to be cached and the minimum number of seconds the cached page is valid. The key of a cached page consists of path information, macro name, HTML or XML block name, plus query string plus form data (if present). Cached web pages are classified by usage scope: PUBLIC or PRIVATE.

The DB2 dynamic web page cache table is: SYSIBM.DTWCACHEDPAGES. The index key for a cached page in the dynamic web page cache table is: INDEXED_KEY CHAR(250), which is the first 250 characters of path information, macro name, HTML or XML block name, query string, and form data. An identifier is specified by: ID INTEGER, which is an identifier derived from path information, macro name, HTML or XML block name, query string, and form data. To provide fast access to the cache, an index to the dynamic web page cache table is provided that consists of both the column for the INDEXED_KEY and the column for the ID.

The actual key of a cached page is: ACTUAL_KEY VARCHAR(4000), which is comprised of the path information, macro name, HTML or XML block name, query string, and form data for the request that created the cached page.

The userid of the creator is: CREATOR CHAR(8), which is the userid associated with a request that created the cached page. The creation timestamp is: CREATION_TIME TIMESTAMP, which specifies the date and time of the creation of the cached page. This date and time is the same as the CREATION_TIME for any LOBs that the web page references.

The expiration timestamp is: EXPIRATION_TIME TIMESTAMP, which specifies the date and time of expiration of the cached page (value of CREATION_TIME +lifetime value from DTW_CACHE_PAGE directive). A second index for the dynamic web page cache table is provided that consists of the column for EXPIRATION_TIME. The indexed column (i.e., EXPIRATION_TIME) of the second index is used to efficiently identify the cached web pages that have expired.

The size is: SIZE INTEGER, which specifies the size of the cached page in bytes. The usage scope is: USAGE_SCOPE SMALLINT; a value of 1 means that the page has a PUBLIC usage scope and a value of 2 means that the page has a PRIVATE usage scope. The ordinal position of the segment is: ORDINAL_POSITION SMALLINT which specifies the ordinal position of the web page segment within the complete cached page. The dynamic web page segment is: PAGE_SEGMENT VARCHAR(28100) FOR BIT DATA, which is the ASCII encoded web page segment.

TABLE 1

SYSIBM.DTWCACHEDPAGES

| Column:<br>Column Datatype | Description |
| --- | --- |
| INDEXED_KEY:<br>CHAR(250) | Indexed key for cached page: the first 250 characters of the actual key |
| ID: INTEGER | Identifier: an identifier derived from the key |
| ACTUAL_KEY:<br>VARCHAR(4000) | The actual key of the cached page: the path information, macro name, HTML or XML block name, query string, and form data of the request that generated the page. |
| CREATOR:<br>CHAR(8) | Userid of creator: userid associated with the request that created the cached page |
| CREATION_TIME:<br>TIMESTAMP | Creation timestamp: date and time of creation of cached page.<br>It is the same as the CREATION-TIME for any LOBs that the Web page references |
| EXPIRATION_TIME:<br>TIMESTAMP | Expiration timestamp: date and time for expiration of cached page (value of CREATION_TIME + lifetime value from DTW_CACHE_PAGE directive) |
| SIZE: INTEGER | Size: size of cached page in bytes |
| USAGE_SCOPE:<br>SMALLINT | Usage scope: a value of 1 means that the page has a PUBLIC usage scope and a value of 2 means that the page has a PRIVATE usage scope |
| ORDINAL_POSITION:<br>SMALLINT | Ordinal position of segment: the ordinal position of the Web page segment within the complete cached page |
| PAGE_SEGMENT<br>VARCHAR(28100)<br>FOR BIT DATA | Dynamic Web page segment: the ASCII encoded Web page segment |

9. Security Considerations and Guidelines

The userid(s) associated with the threads or processes that execute authorization system requests must have the EXECUTE privilege for the stored procedure used to add dynamic web pages to the cache. An administrative userid is typically used to prepare the stored procedure for execution. The administrative userid must have the INSERT, SELECT, and DELETE privileges on the web cache table.

Figure 2:
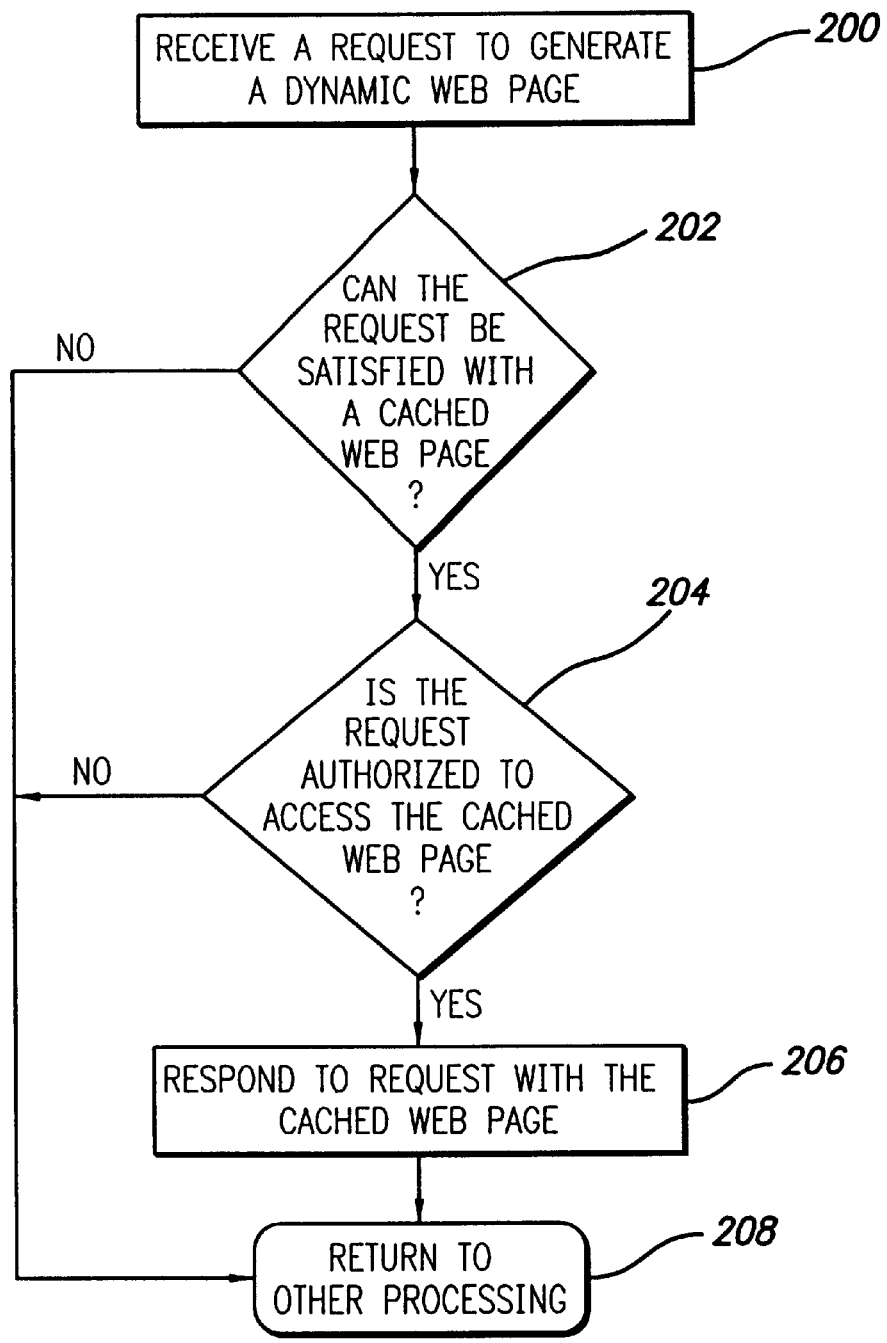
FIG. 2 is a flow chart illustrating the steps performed in accordance with an embodiment of the present invention.

In summary, the present invention permits the association of a usage scope with a cached dynamic web page that constrains access to the content of the dynamic web page when stored in a system cache. A thread or process associated with a userid without the proper authority to generate a cached web page or to access any secured data contained within the cached web page is not permitted to return the cached web page to the user that initiated the request. FIG. 2 is a flowchart that illustrates the steps performed in accordance with the present invention.

Block 200 represents the present invention receiving a request to generate a dynamic web page. Block 202 is a decision block that represents the present invention determining whether the request can be satisfied with a cached web page. When the request cannot be satisfied by a cached web page, then the present invention returns to other processing, as represented by block 208. Otherwise, the present invention proceeds to block 204.

Block 204 is a decision block that represents the present invention determining whether the request is authorized to access the cached web page. When the request lacks authorization to access the cached web page, then the present invention returns to other processing, as represented by block 208. Otherwise, the present invention proceeds to block 206. Block 206 represents the present invention responding to the request with the cached web 15 page.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of processing a request that requires the dynamic generation of a web page, the method comprising the steps of:

receiving a request to generate a dynamic web page;

determining whether the request can be satisfied by using a cached web page and whether an identifier, which is associated with the request, is authorized to access the cached web page by determining whether the identifier is associated with a process having authority to dynamically generate the cached web page; and when it is determined that the request can be satisfied and that the identifier has the proper authorization satisfying the request by using the cached web page.

2. The method of claim 1, further comprising the step of processing a caching directive that defines a usage scope of the cached web page.

3. The method of claim 2, wherein the usage scope is a public usage scope, and wherein determining further comprises determining whether the request is authorized to execute an application program that generated the cached web page.

4. The method of claim 2, wherein determining further comprises determining whether the request can be satisfied based on the usage scope.

5. The method of claim 2, wherein the caching directive specifies an amount of time that the cached web page is valid.

6. The method of claim 1, wherein said determining whether an identifier is authorized to access said cached web page includes determining whether the identifier is associated with a process without authority to access any data within the cached dynamic web page.

7. The method of claim 1, wherein satisfying the request by using the cached web page includes transmitting the cached web page over a wide area network.

8. The method of claim 7, wherein said wide area network is the Internet.

9. A method of processing a request that requires the dynamic generation of a web page, the method comprising the steps of:

receiving a request to generate a dynamic web page;

processing a caching directive that defines a usage scope of the cached web page, wherein the usage scope is a private usage scope and the request has a first user identifier;

determining whether the request can be satisfied by using a cached web page and whether the first identifier, which is associated with the request, is authorized to access the cached web page by determining whether the first identifier is associated with a process having authority to dynamically generate the cached web page, which includes and wherein determining further comprises determining whether the first user identifier matches a second user identifier that was associated with the web-server request which originally created the cached web page; and when it is determined that the request can be satisfied and that the identifier has the proper authorization satisfying the request by using the cached web page.

10. The method of claim 9, wherein determining further comprises determining whether the request can be satisfied based on the usage scope.

11. The method of claim 9, wherein the caching directive specifies an amount of time that the cached web page is valid.

12. The method of claim 9, wherein said determining whether the first identifier is authorized to access said cached web page includes determining whether the first identifier is associated with a process without authority to access any data within the cached dynamic web page.

13. The method of claim 9, wherein satisfying the request by using the cached web page includes transmitting the cached web page over a wide area network.

14. The method of claim 13, wherein said wide area network is the Internet.

15. An apparatus for processing a request that requires the dynamic generation of a web page, the apparatus comprising:

a computer; and one or more programs, performed by the computer, for receiving a request to generate a dynamic web page, determining whether the request can be satisfied by using a cached web page and whether an identifier, which is associated with the request, is authorized to access that cached web page by determining whether the identifier is associated with a process having authority to dynamically generate the cached web page, and when it is determined that the request can be satisfied and that the identifier has the proper authorization, satisfying the request by using the cached web page.

16. The apparatus of claim 7, further comprising one or more programs, performed by the computer, for processing a caching directive that defines a usage scope of the cached web page.

17. The apparatus of claim 16, wherein the usage scope is a public usage scope, and wherein determining further comprises determining whether the request is authorized to execute an application program that generated the cached web page.

18. The apparatus of claim 16, further comprising one or more programs, performed by the computer, for receiving a request to retrieve the web page, and determining whether to retrieve the web page based on the usage scope.

19. The apparatus of claim 16, wherein the caching directive specifies an amount of time that the cached web page is valid.

20. The apparatus of claim 15, wherein said determining whether the first identifier is authorized to access said cached web page includes determining whether the first identifier is associated with a process without authority to access any data within the cached dynamic web page.

21. The apparatus of claim 15, wherein satisfying the request by using the cached web page includes transmitting the cached web page over a wide area network.

22. The apparatus of claim 21, wherein said wide area network is the Internet.

23. An apparatus for processing a request that requires the dynamic generation of a web page, the apparatus comprising:

a computer; and one or more programs, performed by the computer, for receiving a request to generate a dynamic web page; for processing a caching directive that defines a usage scope of the cached web page, wherein the usage scope is a private usage scope and the request has a first user identifier; determining whether the request can be satisfied by using a cached web page and whether the first identifier, which is associated with the request, is authorized to access the cached web page by determining whether the first identifier is associated with a process having authority to dynamically generate the cached web page, which includes determining whether the first user identifier matches a second identifier that was associated with the web server request which originally created the cached web page; and when it is determined that the request can be satisfied and that the first identifier has the proper authorization, satisfying the request by using the cached web page.

24. The apparatus of claim 23, further comprising one or more programs, performed by the computer, for receiving a request to retrieve the web page, and determining whether to retrieve the web page based on the usage scope.

25. The apparatus of claim 23, wherein the caching directive specifies an amount of time that the cached web page is valid.

26. The apparatus of claim 23, wherein said determining whether the first identifier is authorized to access said cached web page includes determining whether the first identifier is associated with a process without authority to access any data within the cached dynamic web page.

27. The apparatus of claim 23, wherein satisfying the request by using the cached web page includes transmitting the cached web page over a wide area network.

28. The apparatus of claim 27, wherein said wide area network is the Internet.

29. An article of manufacture comprising a computer program carrier readable by a computer and embodying one or more instructions executable by the computer to perform method steps for processing a request that requires the dynamic generation of a web page, the method comprising the steps of:

receiving a request to generate a dynamic web page;

determining whether the request can be satisfied by using a cached web page and whether an identifier, which is associated with the request, is authorized to access that cached web page by determining whether the identifier is associated with a process having authority to dynamically generate the cached web page; and when it is determined that the request can be satisfied and that the identifier has the proper authorization satisfying the request by using the cached web page.

30. The article of manufacture of claim 29, further comprising the step of processing a caching directive that defines a usage scope of the cached web page.

31. The article of manufacture of claim 30, wherein the usage scope is a public usage scope, and wherein determining further comprises determining whether the request is authorized to execute an application program that generated the cached web page.

32. The article of manufacture of claim 29, wherein said determining whether an identifier is authorized to access said cached web page includes determining whether the identifier is associated with a process without authority to access any data within the cached dynamic web page.

33. The article of manufacture of claim 29, wherein satisfying the request by using the cached web page includes transmitting the cached web page over a wide area network.

34. The article of manufacture of claim 33, wherein said wide area network is the Internet.

35. An article of manufacture comprising a computer program carrier readable by a computer and embodying one or more instructions executable by the computer to perform method steps for processing a request that requires the dynamic generation of a web page, the method comprising the steps of:

receiving a request to generate a dynamic web page;

processing a caching directive that defines a usage scope of the cached web page, wherein the usage scope is a private usage scope and the request has a first user identifier;

determining whether the request can be satisfied by using a cached web page and whether the first identifier, which is associated with the request, is authorized to access the cached web page by determining whether the first identifier is associated with a process having authority to dynamically generate the cached web page, which includes determining whether the first user identifier matches a second user identifier that was associated with the web server request which originally created the cached web page; and when it is determined that the request can be satisfied and that the identifier has the proper authorization satisfying the request by using the cached web page.

36. The article of manufacture of claim 30, wherein determining further comprises determining whether the request can be satisfied based on the usage scope.

37. The article of manufacture of claim 30, wherein the caching directive specifies an amount of time that the cached web page is valid.

38. The article of manufacture of claim 35, wherein determining further comprises determining whether the request can be satisfied based on the usage scope.

39. The article of manufacture of claim 35, wherein the caching directive specifies an amount of time that the cached web page is valid.

40. The article of manufacture of claim 35, wherein said determining whether the first identifier is authorized to access said cached web page includes determining whether the first identifier is associated with a process without authority to access any data within the cached dynamic web page.

41. The article of manufacture of claim 36, wherein satisfying the request by using the cached web page includes transmitting the cached web page over a wide area network.

42. The article of manufacture of claim 41, wherein said wide area network is the Internet.

* * * * *